(12) United States Patent
Takesue et al.

(10) Patent No.: US 7,084,198 B2
(45) Date of Patent: Aug. 1, 2006

(54) GOLF BALL MATERIAL AND GOLF BALL

(75) Inventors: Rinya Takesue, Chichibu (JP); Yasushi Ichikawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/308,015

(22) Filed: Dec. 3, 2002

(65) Prior Publication Data

US 2003/0134954 A1   Jul. 17, 2003

(30) Foreign Application Priority Data

Dec. 10, 2001   (JP) .............................. 2001-375913

(51) Int. Cl.
*C08L 33/02* (2006.01)
*C08K 5/098* (2006.01)
*A63B 37/12* (2006.01)

(52) U.S. Cl. ...................... 524/322; 524/394; 524/397; 524/400; 473/372; 473/373; 473/385

(58) Field of Classification Search ................ 524/322, 524/394, 397, 400; 473/372, 373, 385
See application file for complete search history.

(56) References Cited

U.S. PATENT DOCUMENTS

| | | | | |
|---|---|---|---|---|
| 5,222,739 A | * | 6/1993 | Horiuchi et al. | 473/356 |
| 5,306,760 A | | 4/1994 | Sullivan | |
| 5,312,857 A | | 5/1994 | Sullivan | |
| 6,653,382 B1 | * | 11/2003 | Statz et al. | 524/400 |
| 6,838,501 B1 | * | 1/2005 | Takesue et al. | 524/394 |
| 2001/0018375 A1 | * | 8/2001 | Hayashi et al. | 473/371 |
| 2002/0091188 A1 | * | 7/2002 | Statz et al. | 524/400 |

FOREIGN PATENT DOCUMENTS

WO   WO98/46671 A1   10/1998

OTHER PUBLICATIONS

Cochran, SCIENCE and GOLF II; 1994; pp. 383-389.*

* cited by examiner

*Primary Examiner*—David J. Buttner
(74) *Attorney, Agent, or Firm*—Sughrue Mion, PLLC

(57) ABSTRACT

A golf ball material comprising a heated mixture of (a) a random copolymer containing at least 5% by weight of a metal ion-neutralized unsaturated carboxylic acid having an acid content of at least 16% by weight, (b) a thermoplastic elastomer, (c) a fatty acid and/or derivative thereof having a molecular weight of 280–1,500, and (d) a basic metal compound capable of neutralizing unneutralized acid groups in components (a) and (c) has good thermal stability, flow and moldability, and can be molded into a part exhibiting excellent rebound, ensuring the manufacture of golf balls with high performance.

19 Claims, No Drawings

GOLF BALL MATERIAL AND GOLF BALL

The present invention relates to golf ball materials which have good thermal stability, flow characteristics and moldability, and which are capable of providing high-performance golf balls endowed with outstanding rebound energy. The invention relates also to golf balls comprising molded parts of such golf ball materials.

BACKGROUND OF THE INVENTION

Over the past few years, wide use has been made of ionomer resins in golf ball cover materials, also referred to hereinafter as "cover stock". Ionomer resins are ionic copolymers composed of an olefin such as ethylene in combination with an unsaturated carboxylic acid such as acrylic acid, methacrylic acid or maleic acid, wherein the acidic groups are partially neutralized with metal ions such as sodium, lithium, zinc or magnesium ions. They have excellent characteristics such as durability, resilience and scuff resistance.

Ionomer resins account for most of the cover stock resin in current use. A variety of improvements have been made thereon because golfers are always on the lookout for golf balls having a high rebound and excellent flight characteristics.

Related improvements taught by the prior art (see U.S. Pat. Nos. 5,312,857, 5,306,760, and International Application WO 98/46671) include cover stocks in which a large amount of metallic soap is added to the ionomer resin to improve the cost and rebound characteristics of the ionomer cover stock.

These cover stocks, however, fall far short of practical levels. During injection molding, the metallic soap in the cover stock decomposes and vaporizes to generate a large amount of fatty acid gas, often causing molding defects. In addition, gas constituents settle on the surface of the molded part to greatly lower the paintability thereof. Moreover, although such cover stock in which a large amount of metallic soap has been added to the ionomer resin does exhibit a rebound which is about the same as or better than that of metallic soap-free ionomer cover stock having the same degree of hardness, the improvement in rebound is not all that large. Indeed, depending on the type of metallic soap used, the moldability and rebound of cover stock may in fact be severely compromised.

SUMMARY OF THE INVENTION

Therefore, one object of the invention is to provide golf ball materials which have good thermal stability, flow and moldability, and which are capable of providing golf balls of outstanding rebound. Another object of the invention is to provide golf balls comprising molded products of the golf ball materials.

It has been found that a mixture obtained by heating and mixing (a) a random copolymer containing at least 5% by weight of a metal ion neutralized product of unsaturated carboxylic acid having an acid content of at least 16% by weight, (b) a thermoplastic elastomer, (c) a fatty acid and/or derivative thereof having a molecular weight of 280 to 1,500, and (d) a basic metal compound capable of neutralizing unneutralized acid groups in components (a) and (c), wherein components (c) and (d) are included in amounts of 5 to 80 parts by weight and 0.1 to 10 parts by weight, respectively, per 100 parts by weight of components (a) and (b) combined, and the weight ratio of component (a) to (b) is from 100/0 to 1/99 has good thermal stability, flow and moldability. The mixture is best suited as a golf ball material because it is effectively injection moldable and a molded part thereof exhibits improved rebound characteristics.

The molded part of the above-described golf ball material can form any desired component of a golf ball (which is selected from among a one-piece golf ball, solid core, solid center, cover and other components). The golf ball thus constructed has very good rebound and improved initial velocity performance. The invention is predicated on these findings.

According to the invention, there is provided a golf ball material comprising a heated mixture of (a) a random copolymer containing at least 5% by weight of a metal ion neutralized product of unsaturated carboxylic acid having an acid content of at least 16% by weight, (b) a thermoplastic elastomer, (c) a fatty acid or derivative thereof or both, having a molecular weight of 280 to 1,500, and (d) a basic metal compound capable of neutralizing unneutralized acid groups in components (a) and (c). Components (c) and (d) are included in amounts of 5 to 80 parts by weight and 0.1 to 10 parts by weight, respectively, per 100 parts by weight of components (a) and (b) combined. The weight ratio of component (a)/(b) is from 100/0 to 1/199.

In a preferred embodiment, component (a) is a metal ion neutralized product of an olefin-unsaturated carboxylic acid random copolymer and/or a metal ion neutralized product of an olefin-unsaturated carboxylic acid-unsaturated carboxylate random copolymer. Also preferably, component (a) contains a plurality of metal ion neutralized unsaturated carboxylic acids which are neutralized with the same metal.

In another preferred embodiment, component (b) is selected from among an olefin elastomer, styrene elastomer, polyester elastomer, polyurethane elastomer, polyamide elastomer, and olefin copolymer and mixtures thereof.

In a further preferred embodiment, component (c) is selected from among stearic acid, oleic acid, linoleic acid, linolenic acid, hydroxystearic acid, ricinoleic acid, arachidic acid, behenic acid, lignoceric acid, and metal ion neutralized products of the foregoing, and mixtures thereof.

In a still further preferred embodiment, component (d) is selected from among magnesium oxide, magnesium hydroxide, magnesium carbonate, zinc carbonate, zinc oxide, sodium hydroxide, sodium carbonate, calcium oxide, calcium hydroxide, lithium hydroxide, lithium carbonate, and mixtures thereof.

The heated mixture typically has a Shore D hardness of 50 to 75.

The invention also provides:

a one-piece golf ball formed of the golf ball material of any one of the foregoing embodiments;

a solid golf ball comprising a solid core of one or more layers and a cover of one or more layers enclosing the core, wherein at least one layer of the solid core or said cover is formed of the golf ball material of any one of the foregoing embodiments;

a solid golf ball comprising a solid core and a cover of one layer enclosing the core, wherein the cover is formed of the golf ball material of any one of the foregoing embodiments; and a solid golf ball comprising a solid core and a cover enclosing the core, the cover including at least outermost and inner layers, wherein at least one inner layer of the cover is formed of the golf ball material of any one of the foregoing embodiments.

DESCRIPTION OF THE PREFERRED EMBODIMENTS

As described above, the golf ball-forming material of the invention comprises a heated mixture of
(a) a random copolymer containing at least 5% by weight of a metal ion neutralized product of unsaturated carboxylic acid having an acid content of at least 16% by weight,
(b) a thermoplastic elastomer,
(c) a fatty acid and/or derivative thereof having a molecular weight of 280 to 1,500, and
(d) a basic metal compound capable of neutralizing unneutralized acid groups in components (a) and (c).

Preferably, component (a) is a metal ion neutralized product of an olefin-unsaturated carboxylic acid random copolymer and/or a metal ion neutralized product of an olefin-unsaturated carboxylic acid-unsaturated carboxylate random copolymer.

The olefin used herein generally has at least 2 carbon atoms, but not more than 8 carbon atoms, and preferably not more than 6 carbon atoms. Illustrative examples include ethylene, propylene, butene, pentene, hexene, heptene and octene. Ethylene is especially preferred.

Suitable examples of the unsaturated carboxylic acid include acrylic acid, methacrylic acid, maleic acid and fumaric acid. Of these, acrylic acid and methacrylic acid are especially preferred.

The unsaturated carboxylate is preferably a lower alkyl ester of the foregoing unsaturated carboxylic acid. Illustrative examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

In the random copolymer, the content of unsaturated carboxylic acid is at least 4% by weight, preferably at least 10% by weight, more preferably at least 12% by weight, even more preferably at least 16% by weight and up to 30% by weight, preferably up to 28% by weight, more preferably up to 25% by weight, even more preferably up to 20% by weight.

The random copolymer used as component (a) may be a mixture of two or more random copolymers. In this event, it is desired that a metal ion-neutralized unsaturated carboxylic acid having an acid content of at least 16% by weight account for at least 5% by weight, preferably at least 15% by weight, more preferably at least 50% by weight, based on the entire random copolymers.

In the random copolymer, acid groups on the unsaturated carboxylic acid are partially neutralized with metal ions. Examples of the metal ions for neutralizing acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $K^+$, $Li^+$, $Zn^{2+}$, $Mg^{2+}$ and $Ca^{2+}$ is preferred. $Na^+$ is especially preferred. In a mixture of random copolymers, unsaturated carboxylic acids are preferably neutralized with the same metal.

Such neutralized random copolymers are prepared by neutralizing the above-mentioned random copolymers with the foregoing metal ions. For example, the random copolymers can be neutralized using formates, acetates, nitrates, carbonates, hydrogencarbonates, oxides, hydroxides or alkoxides of the metal ions.

Component (a) should preferably have a Shore D hardness of 50 to 80, more preferably 55 to 75, even more preferably 60 to 70, and most preferably 63 to 67.

In combination with component (a), the above-described random copolymer in unneutralized form may be included if desired. In this embodiment, the neutralized random copolymer (i.e., component (a)) and the unneutralized random copolymer are preferably mixed in a weight ratio of from 100/0 to 40/60, more preferably from 100/0 to 60/40, and even more preferably from 100/0 to 80/20. Too much an amount of unneutralized random copolymer may compromise mixing and molding abilities.

Component (b) is an optional component for further improving the feel and rebound of the ball when hit. Component (b) is a thermoplastic elastomer which is preferably selected from among olefin elastomers, styrene elastomers, polyester elastomers, polyurethane elastomers, polyamide elastomers, olefin copolymers and mixtures thereof. Of these, olefin elastomers are preferred, with olefin elastomers having crystalline polyolefin blocks being most preferred.

Thermoplastic elastomer (b) should preferably have a Shore A hardness of 20 to 99, more preferably 25 to 95, even more preferably 30 to 90, and most preferably 35 to 85.

The weight ratio of component (a) to (b) is from 100/0 to 1/99, preferably from 95/5 to 30/70, more preferably from 90/10 to 50/50, and most preferably from 85/15 to 60/40.

In the heated mixture, component (c) is a fatty acid or fatty acid derivative having a molecular weight of 280 to 1,500. Its molecular weight is much smaller than that of the resins (a) and (b), and it serves to properly adjust the melt viscosity of the mixture and contributes to an improvement in flow. Also, because the fatty acid or fatty acid derivative has a relatively high content of acid groups or derivative moieties thereof, its addition to the material precludes a substantial loss of rebound.

The molecular weight of fatty acid or fatty acid derivative (c) is at least 280, preferably at least 300, more preferably at least 330, and most preferably at least 360 and up to 1,500, preferably up to 1,000, more preferably up to 600, and most preferably up to 500. Too low a molecular weight fails to improve heat resistance whereas too high a molecular weight fails to improve flow.

The fatty acid or fatty acid derivative (c) may be an unsaturated fatty acid or derivative thereof having a double bond or triple bond in the alkyl group, or it may be a saturated fatty acid or derivative thereof in which all the bonds on the alkyl group are single bonds. In either case, it is recommended that the number of carbon atoms on the molecule generally be at least 18, preferably at least 20, more preferably at least 22, and even more preferably at least 24, but up to 80, preferably up to 60, more preferably up to 40, and even more preferably up to 30. Too few carbons may make it impossible to achieve the improved heat resistance, and may also set the acid group content so high as to cause the acid groups to interact with acid groups present on component (a), diminishing the flow-improving effects. On the other hand, too many carbons increases the molecular weight, which may also lower the flow-improving effects.

Examples of fatty acids (c) include stearic acid, oleic acid, linoleic acid, linolenic acid, hydroxystearic acid, ricinoleic acid, arachidic acid, behenic acid and lignoceric acid. Of these, stearic acid, arachidic acid, behenic acid and lignoceric acid are preferred, with behenic acid being most preferred.

Fatty acid derivatives which may be used as component (c) include metallic soaps in which the proton on the acid group of the foregoing fatty acid has substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{3+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are especially preferred.

Examples of the fatty acid derivatives (c) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Component (c) is included in an amount of 5 to 80 parts by weight, preferably 10 to 40 parts by weight, more preferably 15 to 25 parts by weight, most preferably 18 to 22 parts by weight, per 100 parts by weight of components (a) and (b) combined. Too small an amount of component (c) lowers melt viscosity and compromises workability whereas too large an amount compromises durability.

The golf ball material of the invention includes as essential component (d) a basic inorganic metal compound capable of neutralizing the acid groups in components (a) and (c). In the event a metal soap-modified ionomer resin is used alone, i.e., in the absence of component (d), heating and mixing induces an exchange reaction between the metallic soap and unneutralized acid groups on the ionomer resin, to generate a large amount of fatty acid, as shown below. Because the fatty acid thus formed is thermally unstable and readily vaporizes during molding, this causes molding defects. In addition, the fatty acid thus formed settles on the surface of the molded part, substantially lowering the ability of a paint film to adhere thereto.

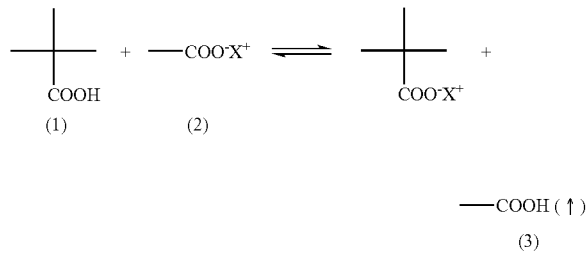

Here, (1) is an unneutralized acid group present on the ionomer resin, (2) is a metallic soap, (3) is a fatty acid, and $X^+$ is a metal cation.

In order to resolve such problems, the present invention incorporates as essential component (d) a basic metal compound which neutralizes the acid groups present in components (a) and (c) for improving the rebound properties of a molded part.

Incorporating essential component (d) serves to neutralize the acid groups in components (a) and (c) to an appropriate extent. These components, when blended together in an optimum proportion, act synergistically to increase the thermal stability of the mixture, impart good moldability and enhance rebound characteristics.

It is recommended that the basic metal compound (d) be highly reactive with component (a) to form reaction by-products which are free of organic acid so that the degree of neutralization of the mixture may be increased without detracting from thermal stability.

Exemplary metal ions that can be used in the basic metal compound (d) include $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$ and $Co^{2+}$. Examples of the basic metal compound include well-known basic inorganic fillers containing these metal ions, such as magnesium oxide, magnesium hydroxide, magnesium carbonate, zinc carbonate, zinc oxide, sodium hydroxide, sodium carbonate, calcium oxide, calcium hydroxide, lithium hydroxide and lithium carbonate. Of these, hydroxides and oxides are preferred. Inter alia, calcium hydroxide and magnesium oxide, especially calcium hydroxide, are preferred since they are more reactive with component (a).

Component (d) is included in an amount of 0.1 to 10 parts by weight, preferably 0.5 to 8 parts by weight, more preferably 1 to 6 parts by weight, most preferably 2 to 5 parts by weight, per 100 parts by weight of components (a) and (b) combined. Too small an amount of component (d) fails to improve thermal stability and resilience whereas too large an amount rather compromises heat resistance.

While the golf ball material of the invention is arrived at by mixing components (a) and (b) with components (c) and (d) in appropriate amounts, it is recommended that at least 50 mol %, preferably at least 60 mol %, more preferably at least 70 mol %, and most preferably at least 80 mol %, of the acid groups in the mixture be neutralized. Such a high degree of neutralization makes it possible to more reliably suppress the exchange reaction which becomes a problem when only the base resin and the fatty acid or fatty acid derivative are used as in the prior art, and thus prevents the formation of fatty acid. As a result, there can be obtained a molding material having greatly increased thermal stability, good moldability and a much larger resilience than prior-art ionomer resins.

It is noted that the degree of neutralization refers to the degree of neutralization of acid groups in the mixture of component (a) and the fatty acid or derivative thereof (c) rather than the degree of neutralization of an ionomer resin itself which is used as the metal ion neutralized random copolymer in component (a). When the inventive mixture is compared with an ionomer resin alone having an identical degree of neutralization, the mixture contains much more metal ions. Then the mixture, when molded, arrives at a higher density of ionic crosslinks contributing to resilience improvement, with a molded part being endowed with greater resilience.

To more reliably achieve both a high degree of neutralization and smooth flow, it is recommended that the acid groups in the mixture be neutralized with transition metal ions and alkali metal and/or alkaline earth metal ions. Although transition metal ions have weaker ionic cohesion than alkali metal and alkaline earth metal ions, the combined use of metal ions of different species to neutralize the acid groups in the mixture can provide a substantial improvement in flow.

It is recommended that the molar ratio between the transition metal ions and the alkali metal and/or alkaline earth metal ions fall in the range of from 10:90 to 90:10, preferably from 20:80 to 80:20, more preferably from 30:70 to 70:30, and most preferably from 40:60 to 60:40. Too low a molar ratio of transition metal ions may fail to provide sufficient improvement in flow, whereas too high a molar ratio may lower resilience.

Illustrative, non-limiting examples of the metal ions include zinc ions as the transition metal ions, and at least one type of ion selected from among sodium ions, lithium ions and magnesium ions as the alkali metal or alkaline earth metal ions.

Any known method may be used in obtaining a mixture in which the desired proportion of the acid groups have been neutralized with transition metal ions and alkali metal or alkaline earth metal ions. For example, specific methods of neutralization with transition metal ions, and in particular zinc ions, include the use of zinc soap as the fatty acid derivative, the inclusion of a zinc ion-neutralized random copolymer (e.g., zinc ion-neutralized ionomer resin) as component (a) in the base resin, and the use of a zinc compound, typically zinc oxide, as the basic metal compound (d).

The golf ball material of the invention can be prepared for a particular application by incorporating in the above-described mixture of essential components whatever additives may be required. For example, where the material is to be used as a cover stock, the mixture may have added thereto such additives as pigments, dispersants, antioxidants, ultraviolet absorbers and light stabilizers. Where such additives are compounded, the addition amount is preferably at least 0.1 part, more preferably at least 0.5 part, and even more preferably at least 1 part by weight and up to 10 parts, more preferably up to 6 parts, and even more preferably up to 4 parts by weight, per 100 parts by weight of the essential components (components (a) to (d)) combined.

The golf ball material of the invention can be arrived at by furnishing a mixture of the above-described essential components and optional components. For instance, necessary ingredients are heated and mixed at a heating temperature of 150 to 250° C. and in an internal mixer such as a kneading-type twin-screw extruder, a Banbury mixer or a kneader. Any desired method may be used to incorporate various additives together with the essential components in the golf ball material of the invention. For example, the additives may be blended with the essential components, and heating and mixing of all the ingredients carried out at the same time. Alternatively, the essential components may be pre-heated and pre-mixed, following which the optional additives may be added and the overall composition subjected to additional heating and mixing.

The golf ball material of the invention is preferably adjusted to an appropriate melt flow rate to provide an adequate flow for injection molding, that is, to improve moldability. It is recommended that the melt flow rate (MFR) of the material, as measured in accordance with JIS-K7210 at a temperature of 190° C. and under a load of 21.18 N (2.16 kgf), be at least 0.5 dg/min, preferably at least 1.0 dg/min, more preferably at least 1.5 dg/min, and most preferably at least 2 dg/min and not more than 20 dg/min, preferably not more than 10 dg/min, more preferably not more than 5 dg/min and most preferably not more than 3 dg/min. If the mixture has too low or too high a melt flow rate, the processability may decrease markedly.

The golf ball material of the invention is preferably optimized in the relative absorbance in infrared absorption spectroscopy, representing the ratio of absorbance at the absorption peak attributable to carboxylate anion stretching vibrations normally detected at 1530 to 1630 $cm^{-1}$ to the absorbance at the absorption peak attributable to carbonyl stretching vibrations normally detected at 1690 to 1710 $cm^{-1}$. For the sake of clarity, this ratio may be expressed as: (absorbance of absorption peak for carboxylate stretching vibrations)/(absorbance of absorption peak for carbonyl stretching vibrations).

Here, "carboxylate stretching vibrations" refers to vibrations by carboxyl groups from which the proton has dissociated (metal ion-neutralized carboxyl groups), whereas "carbonyl stretching vibrations" refers to vibrations by undissociated carboxyl groups. The ratio in these respective peak intensities depends on the degree of neutralization. For commonly used ionomer resins having a degree of neutralization of about 50 mol %, the ratio between these peak absorbances is about 1:1.

To improve the thermal stability, flow, moldability and rebound of the golf ball material, it is recommended that the material have a carboxylate stretching vibration peak absorbance which is at least 1.3 times, preferably at least 1.5 times, and more preferably at least 2 times, the carbonyl stretching vibration peak absorbance. The absence of a carbonyl stretching vibration peak altogether is especially preferred.

The thermal stability of the inventive golf ball material can be measured by thermogravimetry. It is recommended that, in thermogravimetric analysis, the mixture have a weight loss at 250° C., based on the weight of the mixture at 25° C., of not more than 2% by weight, preferably not more than 1.5% by weight, and most preferably not more than 1% by weight.

It is further recommended that the compounding of the golf ball material be adjusted so as to provide a molded part thereof with a Shore D hardness of at least 50, preferably at least 53, more preferably at least 56, even more preferably at least 58, but up to 75, preferably up to 70, more preferably up to 65, even more preferably up to 62. Too high a Shore D hardness may markedly compromise the feel of a golf ball made of the material when hit whereas too low a Shore D hardness may lead to a decline of resilience.

The golf ball material may have any desired specific gravity although it is generally advisable for the specific gravity to be at least 0.9, more preferably at least 0.92, even more preferably at least 0.94, but not more than 1.2, more preferably not more than 1.1, even more preferably not more than 1.05.

The golf ball of the invention has a molded part of the golf ball material according to the invention as a constituent component. The layer or layers made of the golf ball material may constitute a portion or all of the golf ball. The inventive golf balls may be thread-wound balls, including those in which the cover has a single-layer or a multiple-layer construction, one-piece balls, two-piece balls, three-piece balls, or multi-piece balls having a cover composed of three or more layers. The type of golf ball is not critical as long as the ball has a molded part of the inventive golf ball material as a constituent component.

The inventive golf balls may be manufactured by preparing various mixtures for making one-piece balls, the solid centers of thread-wound golf balls, the solid cores of solid golf balls, or cover stock (for at least one layer in cores and covers composed of two or more layers) in accordance with the above-described golf ball material formulation of the invention, then using the mixture in accordance with a golf ball manufacturing method known to the art.

When the cover of a golf ball is made of the golf ball material according to the present invention, the core may be either a thread-wound core or a solid core and may be produced by a conventional method.

For example, a solid core may be produced by preparing a rubber composition composed of 100 parts by weight of cis-1,4-polybutadiene; from 10 to 60 parts by weight of one or more vulcanizing or crosslinking agents selected from among α, β-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition can be formed into a solid spherical core by press vulcanization to effect crosslinkage, followed by compression under heating at 140 to 170° C. for a period of 10 to 40 minutes.

Production of a thread-wound golf ball core may be carried out using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core. Use may be made of rubber thread produced by a conventional method. For example, rubber thread is prepared by compounding natural rubber or synthetic rubber such as polyisoprene with various additives (e.g., antioxidants, vulcanization accelerators and sulfur) to form a rubber composition, which is molded and vulcanized.

The golf balls using the various types of cores described above and falling within the scope of the invention can be produced by forming the cover from the inventive golf ball material. In one such method, a single-layer or multi-layer core prefabricated according to the type of ball to be manufactured is placed in a mold, and the inventive material is heated, mixed and melted, then injection-molded over the core. In this case, the golf ball manufacturing operation can be carried out under conditions which assure that the material maintain excellent thermal stability, flow and moldability. The resulting golf ball has a high rebound.

The method used to produce the cover is not limited to the method described above. In an alternative method which can be used herein, a pair of hemispherical cups is molded from the inventive golf ball material, following which the cups are placed over a core and molded under heat (120 to 170° C.) and pressure for 1 to 5 minutes.

No particular limitation is imposed on the thickness of the cover made of the inventive material, although the cover is generally formed to a thickness of at least 0.5 mm, preferably at least 0.9 mm, more preferably at least 1.1 mm, but up to 3 mm, preferably up to 2.5 mm, more preferably up to 2.0 mm. The cover in the golf balls of the invention is not limited to one layer, and may instead have a multilayer construction of two or more layers. If the cover has a multilayer construction, the golf ball material of the invention may be used either at the interior of the multilayer construction or as the outermost layer of the cover. In the case of a single-layer cover (for two-piece golf ball), it is highly advantageous for the inventive material to serve as the cover material.

If the ball is a multi-piece golf ball having a cover of two or more layers, the inventive material is most preferably used as a layer of the cover other than the outermost layer—that is, as an inner layer of the cover. In this embodiment, the cover outermost layer is preferably formed of a polyurethane elastomer because it cooperates with the cover inner layer so as to impart very high rebound to the golf ball.

The golf ball may have a plurality of dimples formed on its surface, and the cover may be administered various treatment such as surface preparation, stamping and painting. In particular, a golf ball cover made of the inventive material ensures ease of work involved in administering such surface treatment. The outermost layer of the inventive material ensures improvements in working including painting.

The golf ball of the invention may be a golf ball in which the inventive golf ball material is used other than as the cover stock described above. For example, it may be a golf ball arrived at by using the inventive material as a one-piece golf ball material or as a core material. In this case, production may be carried out using well-known materials and methods.

In the golf balls manufactured as described above, the diameter, weight, hardness and other parameters of the cover, solid or liquid center, solid core or thread-wound core, and one-piece golf balls, while not subject to any particular limitations, may be adjusted as appropriate, insofar as the objects of the invention are attainable.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

EXAMPLE

Examples of the invention and comparative examples are given below by way of illustration, and are not intended to limit the invention.

Examples 1–6 and Comparative Examples 1–4

Using a core material composed primarily of cis-1,4-polybutadiene, a solid core was produced having a diameter of 36.4 mm, a weight of 29.4 g, and a deflection of 3.4 mm under a load of 980 N (100 kg).

Inner cover materials of the composition shown in Tables 1 and 2 were injection molded over the solid core to form a cover inner layer of 1.7 mm thick. Next, outer cover materials of the composition shown in Tables 1 and 2 were injection molded over the inner layer to form three-piece solid golf balls having a diameter of 42.8 mm.

The following characteristics were measured or evaluated for the golf balls obtained in each of the above examples. The results are also shown in Tables 1 and 2.

Ball Hardness:

Measured as the deflection (in millimeters) of the ball under a load of 980 N (100 kg).

Initial Velocity:

Measured using the same type of initial velocity instrument as that approved by the United States Golf Association (USGA), and in accordance with USGA rules.

Flight Performance:

Using a hitting machine (manufactured by Miyamae Co., Ltd.) equipped with a driver, a machine test was carried out at a head speed of 45 m/s.

TABLE 1

|  |  |  | Example 1 | Example 2 | Example 3 | Example 4 | Example 5 | Example 6 |
|---|---|---|---|---|---|---|---|---|
| Cover inner layer |  |  |  |  |  |  |  |  |
| Composition (pbw) | Component (a) | Ionomer resin A | 70 |  | 63 | 35 | 20 | 70 |
|  |  | Ionomer resin B |  | 70 |  |  |  |  |
|  |  | Ionomer resin C |  |  |  |  | 80 |  |
|  |  | Ionomer resin D |  |  | 7 | 35 |  |  |
|  | Component (b) | Dynaron 4600P |  |  |  |  |  | 30.0 |
|  |  | Dynaron 6100P | 30.0 | 30.0 | 30.0 | 30.0 | 30.0 |  |
|  | Component (c) | Behenic acid | 20.0 | 20.0 | 20.0 | 20.0 | 20.0 | 20.0 |
|  | Component (d) | Calcium hydroxide | 2.5 | 2.5 | 2.4 | 2.3 | 2.5 | 2.7 |
| Resin properties | Melt flow rate (dg/min) |  | 2.0 | 2.0 | 2.0 | 2.0 | 2.0 | 2.0 |
|  | Cover hardness (Shore D hardness) |  | 58 | 61 | 58 | 58 | 56 | 57 |
| Cover outer layer |  |  |  |  |  |  |  |  |
| Composition (pbw) | Thermoplastic polyurethane elastomer |  | 100.0 | 100.0 | 100.0 | 100.0 | 100.0 | 100.0 |
|  | Titanium dioxide |  | 2.0 | 2.0 | 2.0 | 2.0 | 2.0 | 2.0 |
| Resin properties | Hardness (Shore D hardness) |  | 50 | 50 | 50 | 50 | 50 | 50 |
|  | Specific gravity |  | 1.19 | 1.19 | 1.19 | 1.19 | 1.19 | 1.19 |
| Ball properties |  |  |  |  |  |  |  |  |
| Weight (g) |  |  | 45.2 | 45.2 | 45.2 | 45.2 | 45.2 | 45.2 |
| Hardness (mm) |  |  | 2.64 | 2.52 | 2.64 | 2.64 | 2.72 | 2.68 |
| Initial velocity (m/s) |  |  | 77.3 | 77.5 | 77.2 | 77.1 | 77.0 | 77.1 |
| Flight performance (HS45) | Carry (m) |  | 224 | 226 | 223 | 222 | 221 | 222 |
|  | Total (m) |  | 245 | 246 | 244 | 243 | 243 | 244 |

TABLE 2

|  |  |  | Comparative Example 1 | Comparative Example 2 | Comparative Example 3 | Comparative Example 4 |
|---|---|---|---|---|---|---|
| Cover inner layer |  |  |  |  |  |  |
| Composition (pbw) | Component (a) | Ionomer resin A | 70 |  | 20 | 70 |
|  |  | Ionomer resin B |  | 70 |  |  |
|  |  | Ionomer resin C |  |  | 80 |  |
|  |  | Ionomer resin D |  |  |  |  |
|  | Component (b) | Dynaron 4600P |  |  |  | 30.0 |
|  |  | Dynaron 6100P | 30.0 | 30.0 | 30.0 |  |
|  | Component (c) | Behenic acid |  |  |  |  |
|  | Component (d) | Calcium hydroxide |  |  |  |  |
| Resin properties | Melt flow rate (dg/min) |  | 2.5 | 1.8 | 2.0 | 2.0 |
|  | Cover hardness (Shore D hardness) |  | 58 | 61 | 56 | 57 |
| Cover outer layer |  |  |  |  |  |  |
| Composition (pbw) | Thermoplastic polyurethane elastomer |  | 100.0 | 100.0 | 100.0 | 100.0 |
|  | Titanium dioxide |  | 2.0 | 2.0 | 2.0 | 2.0 |
| Resin properties | Hardness (Shore D hardness) |  | 50 | 50 | 50 | 50 |
|  | Specific gravity |  | 1.19 | 1.19 | 1.19 | 1.19 |
| Ball properties |  |  |  |  |  |  |
| Weight (g) |  |  | 45.2 | 45.2 | 45.2 | 45.2 |
| Hardness (mm) |  |  | 2.64 | 2.52 | 2.72 | 2.68 |
| Initial velocity (m/s) |  |  | 76.7 | 77.0 | 76.5 | 76.6 |
| Flight performance (HS45) | Carry (m) |  | 220 | 220 | 219 | 219 |
|  | Total (m) |  | 240 | 242 | 238 | 238 |

Ionomer resin A: Sodium ion-neutralized ethylene-methacrylic acid random copolymer, acid content 18%
Ionomer resin B: Sodium ion-neutralized ethylene-methacrylic acid random copolymer, acid content 20%
Ionomer resin C: Sodium ion-neutralized ethylene-methacrylic acid random copolymer, acid content 15%
Ionomer resin D: Zinc ion-neutralized ethylene-methacrylic acid random copolymer, acid content 18%
Dynaron ® 4600P: Styrene-ethylene butylene-crystalline olefin block copolymer produced by JSR Corp.
Dynaron ® 6100P: Crystalline olefin block-ethylene butylene-crystalline olefin block copolymer produced by JSR Crop.

The golf ball material of the invention has good thermal stability, flow characteristics and moldability, and can be molded into a part exhibiting excellent rebound, ensuring the manufacture of golf balls with high performance. The golf balls of the invention having a molded part of the inventive golf ball material as a constituent component can be manufactured easily and efficiently, and have excellent rebound.

Japanese Patent Application No. 2001-375913 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball material comprising a heated mixture of
   (a) a random copolymer containing at least 5% by weight of a $Na^+$ ion neutralized product of unsaturated carboxylic acid having an acid content of at least 16% by weight,
   (b) an olefin elastomer having crystalline polyolefin blocks,
   (c) a fatty acid or derivative thereof or both, having a molecular weight of 280 to 1,500, and
   (d) a basic metal compound capable of neutralizing unneutralized acid groups in components (a) and (c),
   wherein components (c) and (d) are included in amounts of 5 to 80 parts by weight and 0.1 to 10 parts by weight, respectively, per 100 parts by weight of components (a) and (b) combined, and the weight ratio of component (a) to (b) is from 95/5 to 70/30.

2. The golf ball material of claim 1 wherein component (a) is a $Na^+$ ion neutralized product of an olefin-unsaturated carboxylic acid random copolymer or a $Na^+$ ion neutralized product of an olefin-unsaturated carboxylic acid-unsaturated carboxylate random copolymer or both.

3. The golf ball material of claim 1 wherein component (a) contains a plurality of $Na^+$ ion neutralized unsaturated carboxylic acids.

4. The golf ball material of claim 2, wherein the olefin is at least one selected from the group consisting of ethylene, propylene, butane, pentene, hexene, heptene and octane.

5. The golf ball material of claim 1 wherein component (c) is at least one selected from the group consisting of stearic acid, oleic acid, linoleic acid, linolenic acid, hydroxystearic acid, ricinoleic acid, arachidic acid, behenic acid, lignoceric acid, and metal ion neutralized products of the foregoing.

6. The golf ball material of claim 1 wherein component (d) is at least one selected from the group consisting of magnesium oxide, magnesium hydroxide, magnesium carbonate, zinc carbonate, zinc oxide, sodium hydroxide, sodium carbonate, calcium oxide, calcium hydroxide, lithium hydroxide, and lithium carbonate.

7. The golf ball material of claim 1 wherein the heated mixture has a Shore D hardness of 50 to 75.

8. The golf ball material of claim 2, wherein the unsaturated carboxylic acid is at least one selected from the group consisting of acrylic acid, methacrylic acid, maleic acid and fumaric acid.

9. The golf ball material of claim 2, wherein the unsaturated carboxylate is at least one selected from the group consisting of methyl methacrylate, ethyl methacrylate, propyl methacrylate, butyl methacrylate, methyl acrylate, ethyl acrylate, propyl acrylate and butyl acrylate.

10. A solid golf ball comprising a solid core of one or more layers and a cover of one or more layers enclosing the core, wherein a layer of the cover other than an outermost layer is formed of a material comprising a heated mixture of
    (a) a random copolymer containing at least 5% by weight of a $Na^+$ ion neutralized product of unsaturated carboxylic acid having an acid content of at least 16% by weight,
    (b) an olefin elastomer having crystalline polyolefin blocks,
    (c) a fatty acid or derivative thereof or both, having a molecular weight of 280 to 1,500, and
    (d) a basic metal compound capable of neutralizing unneutralized acid groups in components (a) and (c),
    wherein components (c) and (d) are included in amounts of 5 to 80 parts by weight and 0.1 to 10 parts by weight, respectively, per 100 parts by weight of components (a) and (b) combined, and the weight ratio of component (a) to (b) is from 95/5 to 70/30, and
    wherein the outermost layer of the cover is formed of a polyurethane elastomer.

11. The solid golf ball of claim 10, wherein component (a) is a $Na^+$ ion neutralized product of an olefin-unsaturated carboxylic acid random copolymer or a $Na^+$ ion neutralized product of an olefin-unsaturated carboxylic acid-unsaturated carboxylate random copolymer or both.

12. The solid golf ball of claim 10, wherein component (a) contains a plurality of $Na^+$ ion neutralized unsaturated carboxylic acids.

13. The solid golf ball of claim 10, wherein component (b) is at least one selected from the group consisting of an olefin elastomer, styrene elastomer, polyester elastomer, polyurethane elastomer, polyamide elastomer, and olefin copolymer.

14. The solid golf ball of claim 10, wherein component (c) is at least one selected from the group consisting of stearic acid, oleic acid, linoleic acid, linolenic acid, hydroxystearic acid, ricinoleic acid, arachidic acid, behenic acid, lignoceric acid, and metal ion neutralized products of the foregoing.

15. The solid golf ball of claim 10, wherein component (d) is at least one selected from the group consisting of magnesium oxide, magnesium hydroxide, magnesium carbonate, zinc carbonate, zinc oxide, sodium hydroxide, sodium carbonate, calcium oxide, calcium hydroxide, lithium hydroxide, and lithium carbonate.

16. The solid golf ball of claim 10, wherein the heated mixture has a Shore D hardness of 50 to 75.

17. The solid golf ball of claim 11, wherein the olefin is at least one selected from the group consisting of ethylene, propylene, butane, pentene, hexene, heptene and octane.

18. The solid golf ball of claim 11, wherein the unsaturated carboxylic acid is at least one selected from the group consisting of acrylic acid, methacrylic acid, maleic acid and fumaric acid.

19. The solid golf ball of claim 11, wherein the unsaturated carboxylate is at least one selected from the group consisting of methyl methacrylate, ethyl methacrylate, propyl methacrylate, butyl methacrylate, methyl acrylate, ethyl acrylate, propyl acrylate and butyl acrylate.

* * * * *